(12) United States Patent
Beaver

(10) Patent No.: US 11,325,569 B2
(45) Date of Patent: May 10, 2022

(54) DUMP-TRUCK FLUID ASSISTANCE SYSTEM AND METHOD

(71) Applicant: Pat Beaver, Amite, LA (US)

(72) Inventor: Pat Beaver, Amite, LA (US)

( * ) Notice: Subject to any disclaimer, the term of this patent is extended or adjusted under 35 U.S.C. 154(b) by 291 days.

(21) Appl. No.: 16/555,868

(22) Filed: Aug. 29, 2019

(65) Prior Publication Data

US 2021/0061238 A1    Mar. 4, 2021

(51) Int. Cl.
*B60S 1/66* (2006.01)
*B08B 3/02* (2006.01)
*B60P 1/28* (2006.01)

(52) U.S. Cl.
CPC ...... *B60S 1/66* (2013.01); *B08B 3/02* (2013.01); *B60P 1/28* (2013.01)

(58) Field of Classification Search
CPC combination set(s) only.
See application file for complete search history.

(56) References Cited

U.S. PATENT DOCUMENTS

| | | |
|---|---|---|
| D199,502 S | 11/1964 | Jacobs |
| 3,372,875 A | 3/1968 | Torrey |
| 4,790,715 A | 12/1988 | Alexander |
| 4,911,330 A | 3/1990 | Vlaanderen et al. |
| 4,972,972 A | 11/1990 | Goguen |
| 5,004,156 A | 4/1991 | Montanier |
| 6,615,438 B1 * | 9/2003 | Franco ............... B60S 1/488 15/250.02 |
| 9,073,690 B1 * | 7/2015 | Hobson ............... B60P 1/283 |
| 10,232,830 B2 | 3/2019 | Frederick et al. |
| 2008/0110476 A1 | 5/2008 | Amestoy et al. |
| 2010/0045093 A1 | 2/2010 | Foisie |
| 2019/0001934 A1 * | 1/2019 | Frederick ............... B05B 9/035 |

FOREIGN PATENT DOCUMENTS

WO    WO2014069038 A1    5/2014

* cited by examiner

*Primary Examiner* — Cristi J Tate-Sims
(74) *Attorney, Agent, or Firm* — Keaty Law Firm LLC

(57) ABSTRACT

A dump-truck fluid assistance system and method for prevention and remediation of material sticking to the truck bed and dampening generation of dust, at different stages of loading, transport, and dumping operations. Fluid is emitted from one or more outflow manifolds inside the bed of the dump truck for one or more purposes of lubricating the truck bed, regulating the temperature of the truck bed, physically flushing material from the truck bed, and dampening generation of airborne particles or dust. Under the control of a controller having a controller transceiver, directed via a cab operator transceiver or remote operator transceiver, a fluid pump sends fluid from a fluid reservoir via a fluid line into the outflow manifolds that emit the flow of fluid variously as spray, stream, jet, drip, or weep, into the bed of the dump truck.

20 Claims, 9 Drawing Sheets

DUMP-TRUCK FLUID ASSISTANCE SYSTEM AND METHOD

BACKGROUND OF THE INVENTION

This invention provides a dump-truck fluid assistance system and method for prevention and remediation of material sticking to the truck bed and dampening generation of dust, at different stages of loading, transport, and dumping operations.

Dump trucks are used to move large loads of material, such as dirt, sand, rocks, asphalt, and construction debris. In a large operation, a large number of dump trucks in rotation will haul a substantially continuous amount of material, with little or no opportunity to clean or prepare the dump trucks between loads, but with periods of waiting a turn to load or unload.

Dump trucks generally have truck beds made of aluminum instead of heavier steel in order to reduce the unloaded weight of the truck and allow hauling of more weight per load. The materials hauled, such as asphalt, have a significantly greater tendency to stick to aluminum than to steel. The sticking of materials to the dump truck bed is undesirable for a number of reasons, and can be dangerous because the forward end of the dump truck bed can be raised very high in the air, but if the bed is raised to an extreme height in order to try to dislodge a stuck lump of material, the bed is raised to the level of overhead power lines and the higher center of gravity makes the entire dump truck unstable and prone to toppling over. A heavy lump of material stuck to a forward portion of the truck bed adds to the high-center-of-gravity instability problem.

Stuck material from a prior load eventually has to be removed both for stability reasons and to prevent contamination of any subsequent loads of different materials. But such cleaning of materials stuck for a long time, and possibly hardened and baked on by heat, is difficult and can be dangerous when it involves persons entering the dump truck bed.

Presently, some dump truck operators try to prevent the sticking of materials to the truck bed by coating the interior of the truck bed with a solvent or lubricant before loading. For hauling asphalt, a spray of diesel fuel is often applied using a garden-type sprayer and often requiring climbing on or even entering the fume-filled truck bed. And under likely circumstances of having to wait to load, frequently with the dump truck baking in the heat and with the dump truck operator away from the truck, the applied solvent or lubricant is likely to evaporate before the truck is loaded.

Where sandy dirt or ash or similar material is being hauled, the raising of dust during loading, transport, and unloading can range from being an annoyance to being a safety or environmental hazard. During transport the potentially dusty load can be covered with a fabric cover to provide some protection from agitation from wind, but during loading and unloading such a cover cannot be used, and the material is agitated much more during loading and unloading than during transport.

What is needed is a dump-truck fluid assistance system and method that can be operated safely, without entering the bed of the truck, and efficiently, without requiring extra steps or extra time for preparing and cleaning the truck bed.

SUMMARY OF THE INVENTION

This invention provides a dump-truck fluid assistance system and method for prevention and remediation of material sticking to the truck bed and dampening generation of dust, at different stages of loading, transport, and dumping operations. Fluid is emitted from one or more outflow manifolds inside the bed of the dump truck for one or more purposes of lubricating the truck bed, regulating the temperature of the truck bed, physically flushing material from the truck bed, and dampening generation of airborne particles or dust.

Under the control of a controller having a controller transceiver, directed via a cab operator transceiver or remote operator transceiver, a fluid pump sends fluid from a fluid reservoir via a fluid line into the outflow manifolds that emit the flow of fluid variously as spray, stream, jet, drip, or weep, into the bed of the dump truck.

BRIEF DESCRIPTION OF THE DRAWINGS

Reference will now be made to the drawings, wherein like parts are designated by like numerals, and wherein.

DETAILED DESCRIPTION OF THE INVENTION

Figure 1:
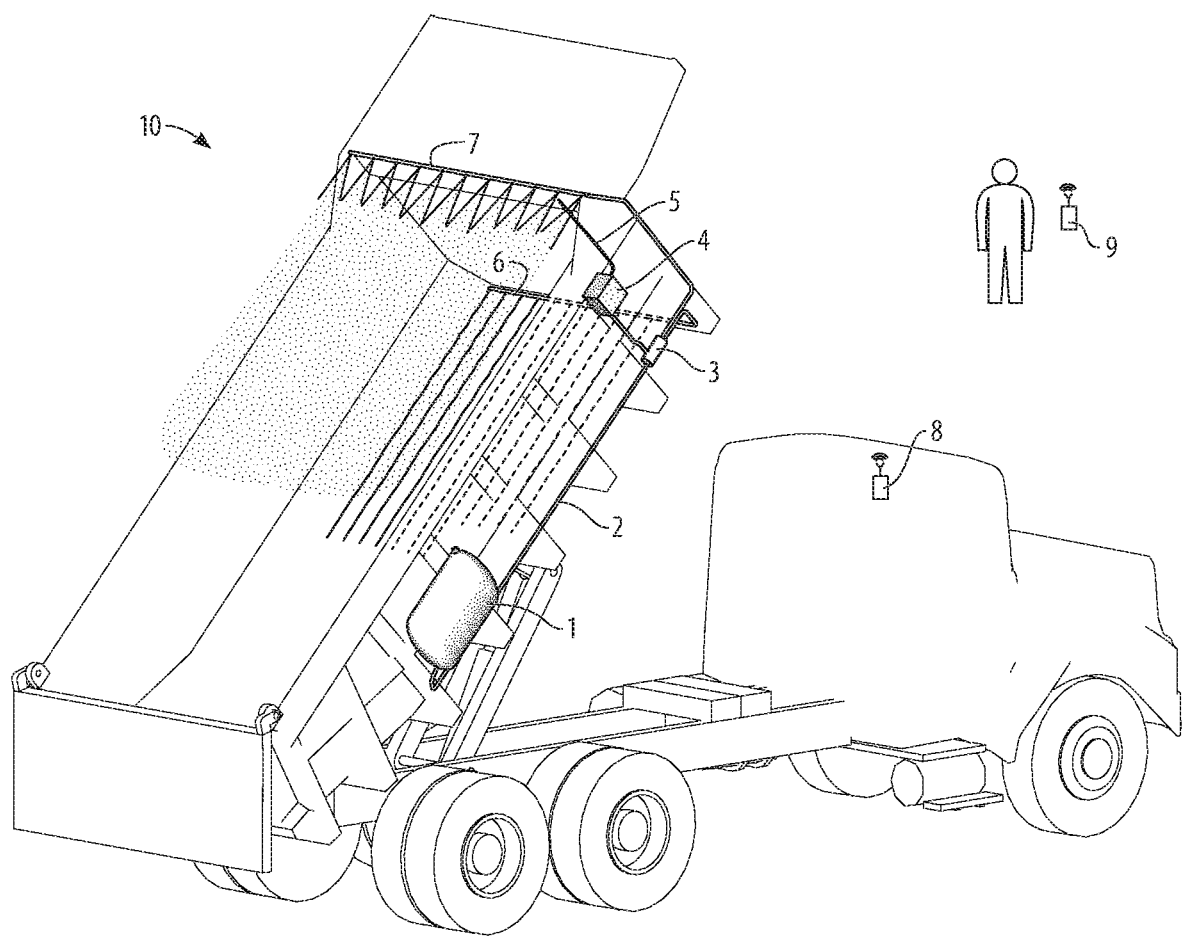
FIG. 1 is a perspective view of an embodiment of the dump-truck fluid assistance system of the invention in use of two outflow manifolds during unloading.

Referring to FIG. 1, the dump-truck fluid assistance system and method 10 are shown schematically, in use with a dump truck having the truck bed in the raised or dumping position. Fluid is shown being emitted as streams from a lower outflow manifold 6 positioned on or near the floor of the truck bed at the point highest when the truck bed is raised, as shown. Fluid is shown being emitted as a spray or mist from a higher outflow manifold 7 positioned on or near the top of the forward wall of the truck bed at the point highest when the truck bed is raised, as shown.

The emitted fluid can be a liquid, such as water, and can be a gas, such as compressed air. Liquid fluid can be plain water, water containing additives, a low-flashpoint solvent, or another low-flashpoint liquid such as diesel fuel. Water can contain additives such as detergents or wetting agents to prevent or release sticking of material being transported in the dump truck.

Depending on the properties of the type of material being transported and dumped, the fluid can serve one or more of the purposes of lubricating the truck bed, regulating the temperature of the truck bed, physically flushing material from the truck bed, and maintaining a moisture level of the material to, for instance, dampen the generation of airborne particles or dust from the material. The fluid can serve these various purposes at different stages of the loading, transport, and dumping operations.

Operation of the dump-truck fluid assistance system 10 is controlled by an operator transceiver such as a cab operator transceiver 8 in the cab of the dump truck or a remote operator transceiver 9 that can be used outside the cab of the dump truck. In loading or dumping operations where the operator exits the cab while waiting for loading or dumping, or where the dump truck is designed to be operated from outside the cab, the remote operator transceiver 9 allows continuing use of the dump-truck fluid assistance system 10 to, for instance, cool and lubricate the empty bed of the truck just prior to loading by releasing a flow of fluid into the truck bed. Built-up heat energy will be dissipated in heating the liquid water toward its vapor phase, and the remaining liquid water and any non-volatile additives will form a lubricating coating inside the truck bed. When loading material subject to generating dust, the dump truck operator can stand at a safe distance and, through the remote operator transceiver 9, cause a spray of fluid to dampen and suppress any dust particles, in addition to cooling and lubricating the truck bed. Where the generated dust has a potential to ignite or explode, the suppression of dust formation and the elimination of built-up heat is particularly beneficial. In such a case, water containing a fire-retarding additive might be used.

Figure 2:
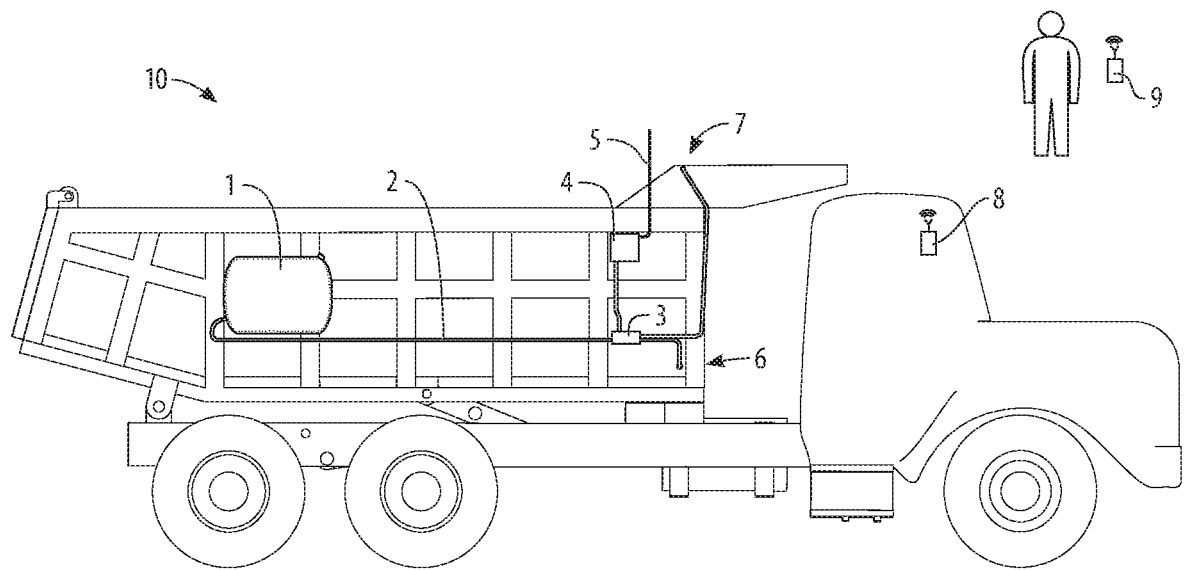
FIG. 2 is a side view of the dump-truck fluid assistance system of the invention.
Figure 3:
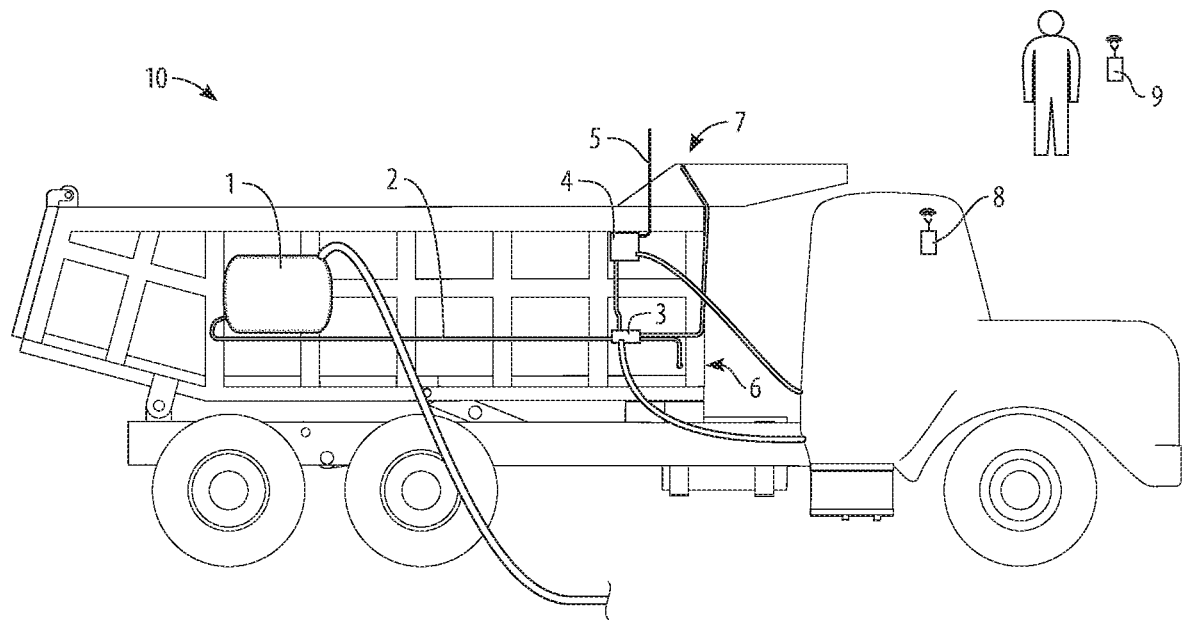
FIG. 3 is a side view of the dump-truck fluid assistance system in use.

Referring to FIG. 2 and FIG. 3, the dump-truck fluid assistance system 10 provides a fluid reservoir 1 that can be mounted upon the bed of the dump truck. The fluid reservoir 1 allows for operation of the dump-truck fluid assistance system 10 at remote locations or underway on the road. At locations where a supply of fluid, such as water, is available, the fluid reservoir 1 can be refilled, including, as an option, a continuous refilling during operations, leaving a full reservoir. In a preferred embodiment, for stability in use, the fluid reservoir 1 is mounted upon the exterior of the bed of the dump truck at a location where the weight of the fluid reservoir 1 is at or near the pivot point of the dump truck bed, which will be over the rear axle or axles. Such a location avoids a large movement of the weight of the fluid reservoir into a higher and less stable position during raising of the truck bed.

A fluid line 2 conveys fluid from the fluid reservoir 1 to a fluid pump 3. The fluid pump 3 can be provided with an incorporated electric motor for pumping power, or can be powered with externally supplied compressed air or hydraulic fluid. Where the dump truck has air brakes and consequently an existing supply of compressed air, the choice of compressed air for powering the fluid pump 3 is particularly appropriate. Similarly, where the movement of the dump truck bed is powered hydraulically, the existing source of pressurized hydraulic fluid can be used. In a preferred embodiment, for efficiency, the fluid pump 3 is mounted near the forwardmost truck bed wall and therefore near the outflow manifolds. Such a location avoids the fluid pump 3 having to provide the higher outflow pressures and compensate for the larger pressure differentials that would be required where the fluid pump is significantly rearward of the outflow manifolds and therefore significantly lower when the truck bed is raised.

Operation of the dump-truck fluid assistance system 10 is controlled by a controller 4 having a controller transceiver 5 through which the dump truck operator directs the activation, deactivation, and rate of flow of the system. In a minimal embodiment where the dump truck operator is only meant to control the dump-truck fluid assistance system 10 from the cab or immediately beside the dump truck, the controller transceiver 5 and the cab operator transceiver 8 can provide only a direct wired connection. Where remote operation is to be provided, the controller transceiver 5 and the remote operator transceiver can provide wireless transceivers, as indicated by the representation of the controller transceiver 5 as an antenna in the drawings. Such an antenna should be placed such that the metal bodies of the truck bed and cab do not block the signal.

The controller 4 can be powered by an internal or external battery, which is appropriate in embodiments using compressed air as a source of power for the fluid pump 3, or by a connection to the dump truck's electrical system, which can provide sufficient electrical power to operate an electric pump.

Figure 4:
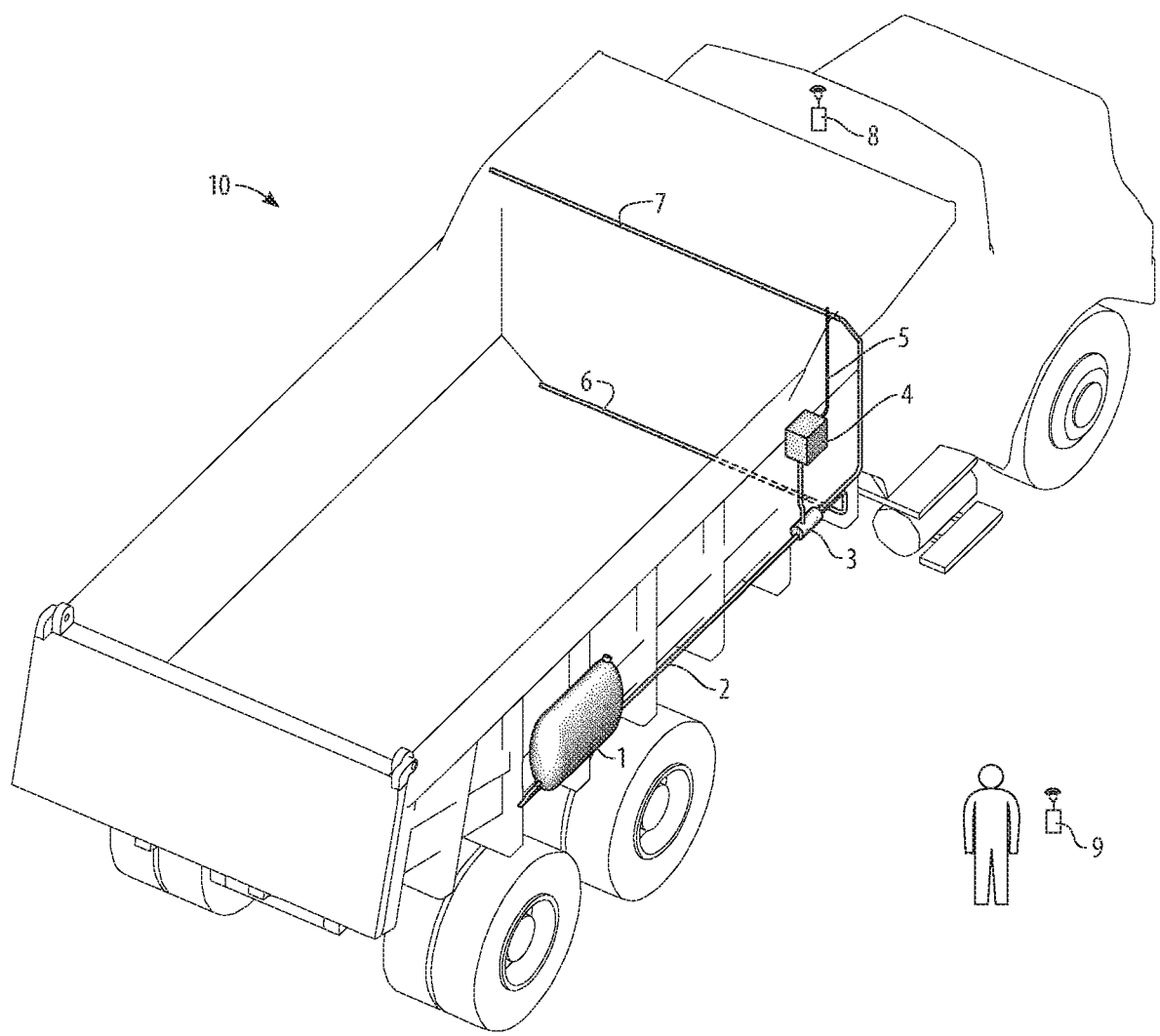
FIG. 4 is a perspective view of an embodiment of the dump-truck fluid assistance system of the invention during loading.

Referring to FIG. 4, the dump-truck fluid assistance system 10 provides at least one outflow manifold through which fluid is flowed, variously by spray, stream, jet, drip, or weep, into the bed of the dump truck. Under the control of the controller 4, the fluid pump 3 pumps fluid into the outflow manifold or manifolds. A preferred embodiment provides two outflow manifolds, a lower outflow manifold 6 and a higher outflow manifold 7. The lower outflow manifold is placed on or near the floor of the bed of the dump truck, at or near the forwardmost side wall of the bed, which is the most forward end of the floor of the bed when the bed is down, and the highest end of the floor when the bed is raised. The higher outflow manifold 7 is placed on or near the forwardmost side wall of the bed, at or slightly above the average height of the bed. Dump trucks have a variety of configurations of forwardmost side walls, usually including an extension up and partially over the cab. The higher outflow manifold 7 is placed such that most of the emitted fluid is directed toward the interior of the truck bed and not spraying over or past the interior of the bed.

In a preferred embodiment providing more than one outflow manifold, the fluid pump 3, under the control of the controller 4, provides separate flows of fluid to the outflow manifolds, which are separately controllable and adjustable as to activation, deactivation, and rate of flow.

Figure 5:
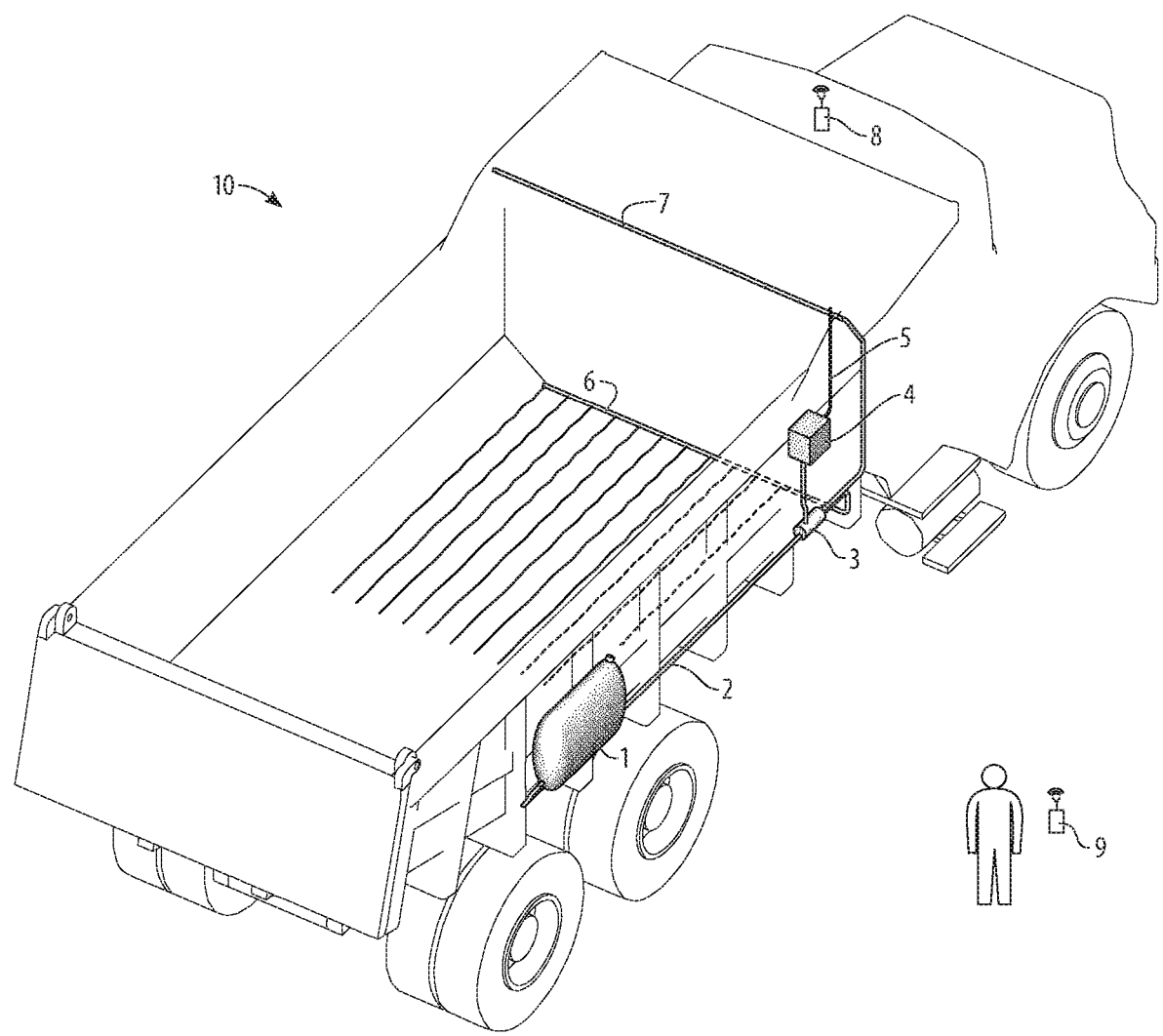
FIG. 5 is a perspective view of an embodiment of the dump-truck fluid assistance system of the invention in use of the lower outflow manifold during loading.

Referring to FIG. 5, showing the dump-truck fluid assistance system 10 in use on a dump truck having the truck bed down, such as during a loading operation, streams of fluid are being emitted onto the floor of the truck bed through a lower outflow manifold 6. This phase of operation can be used, in hot conditions, to cool the truck bed prior to loading, where the built-up heat energy will be dissipated in raising the fluid temperature toward its boiling point, a reason for cooling being to prevent a material such as asphalt from heat-bonding to the bed. Alternatively, in cold conditions, an anti-freeze fluid can be used to prevent the formation of ice which might bond water-containing material to the bed. Or a fluid acting as a solvent for the material being hauled can be used as a coating in preparation for loading. Where water is used to cool the truck bed, residual un-evaporated water and additives will remain on the floor of the truck bed and will function as a coating in preparation for loading.

Figure 6:
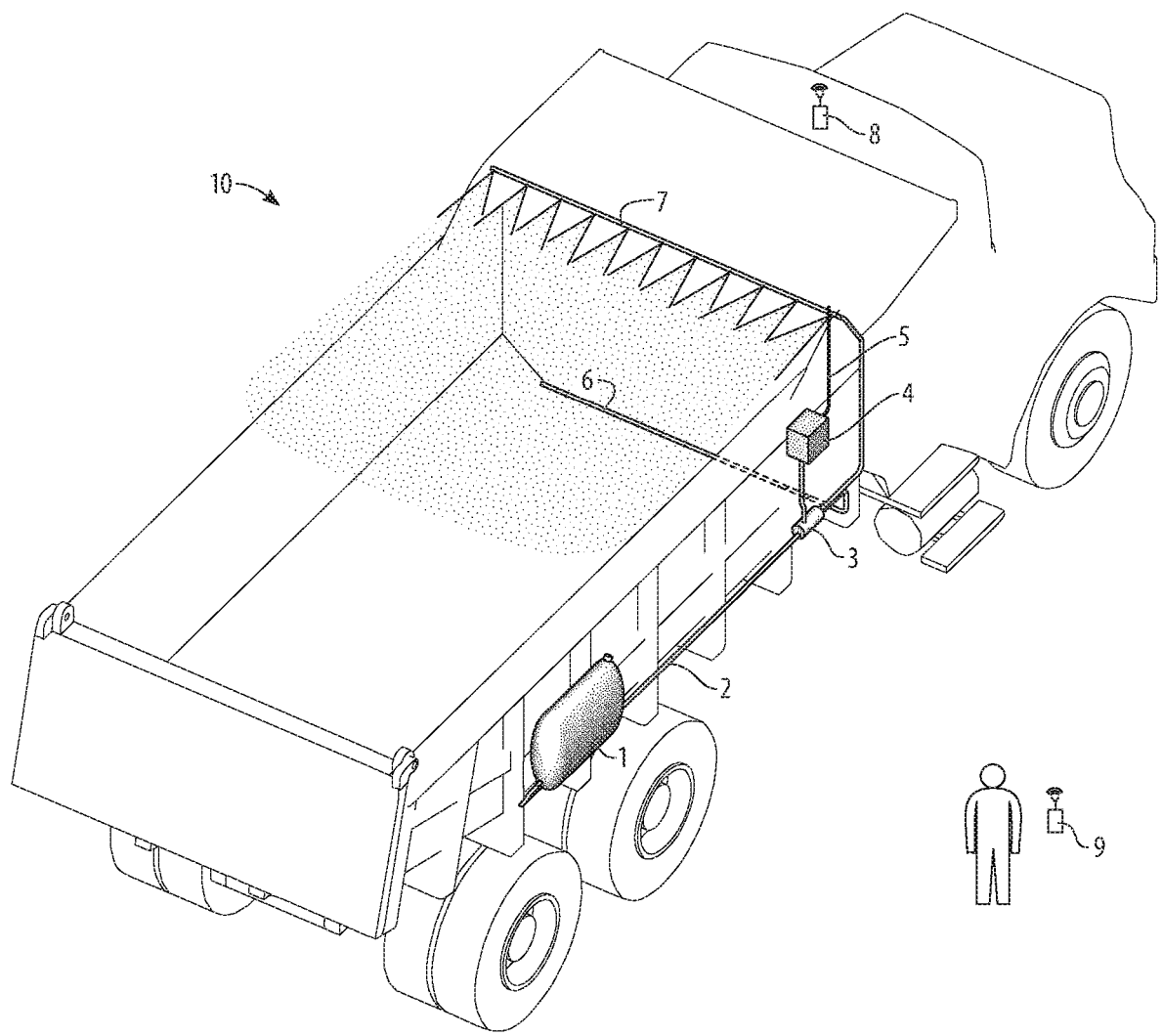
FIG. 6 is a perspective view of an embodiment of the dump-truck fluid assistance system of the invention in use of the higher outflow manifold during loading.

Referring to FIG. 6, showing the dump-truck fluid assistance system 10 in use on a dump truck having the truck bed down, such as during a loading operation, sprays of fluid are being emitted into the bed of the dump truck through a higher outflow manifold 7. This phase of operation can be used to regulate the temperature and to lubricate and coat the truck bed, as above, and also to settle and prevent the formation of dust from the material during the loading process, improving the safety and environmental impacts of the process.

Figure 7:
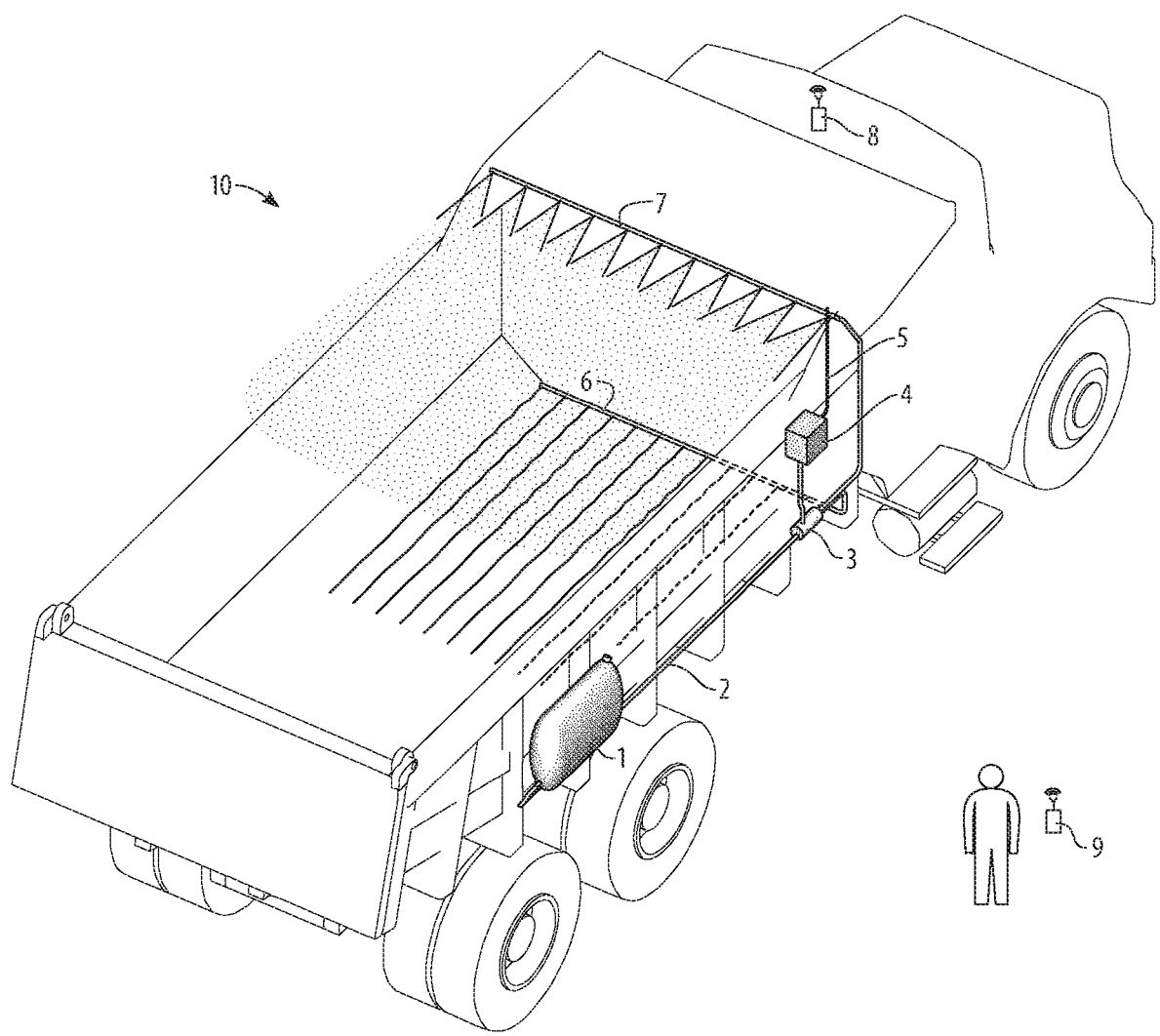
FIG. 7 is a perspective view of an embodiment of the dump-truck fluid assistance system of the invention in use of two outflow manifolds during loading.

Referring to FIG. 7, showing the dump-truck fluid assistance system 10 in use on a dump truck having the truck bed down, such as during a loading operation, in a preferred embodiment, the emission of fluid from a lower outflow manifold 6 and higher outflow manifold 7 can be controlled independently and can be performed simultaneously or not.

Figure 8:
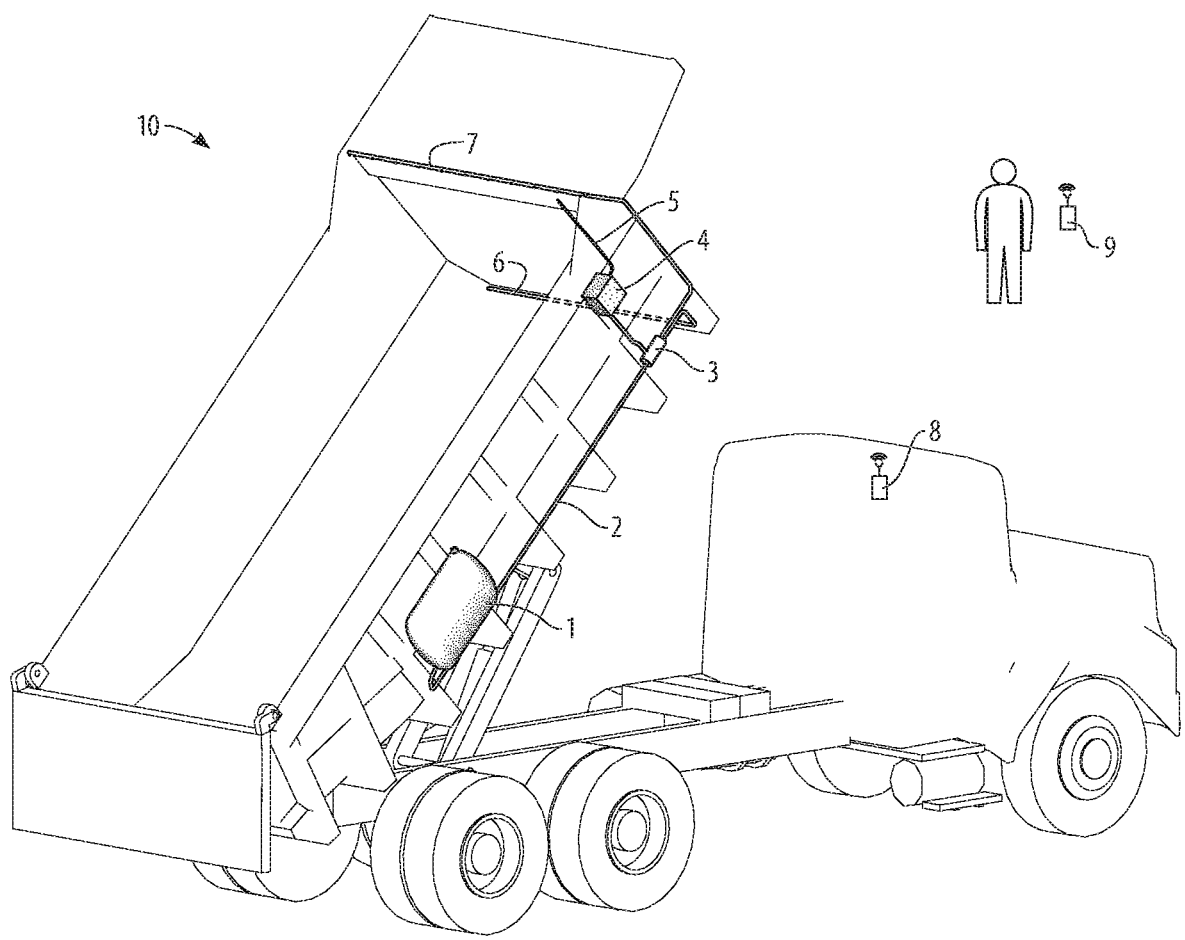
FIG. 8 is a perspective view of an embodiment of the dump-truck fluid assistance system of the invention during unloading.

Referring to FIG. 8, showing the dump-truck fluid assistance system 10 in use on a dump truck having the truck bed up, such as during an unloading operation, operation of the dump-truck fluid assistance system 10 can be directed from the dump truck itself using the cab operator transceiver 8 or from outside and away from the truck using the remote operator transceiver 9, as is likely to be the case during loading and unloading operations involving a large number of dump trucks and consequent periods of waiting to load or unload. The remote operator transceiver 9 can be implemented on a mobile computing device, such as a smartphone, tablet, or laptop. The mobile computing device implementation can use a cellular telephone network, however the cellular telephone network might not provide adequate coverage at some remote worksites. For instance, in a preferred embodiment with a smartphone, the direct wireless networking capabilities of most current smartphones are used, taking advantage of the existing networking, collision, and security protocols in place, and the controller transceiver 5 is provided with corresponding direct wireless networking capabilities.

Figure 9:
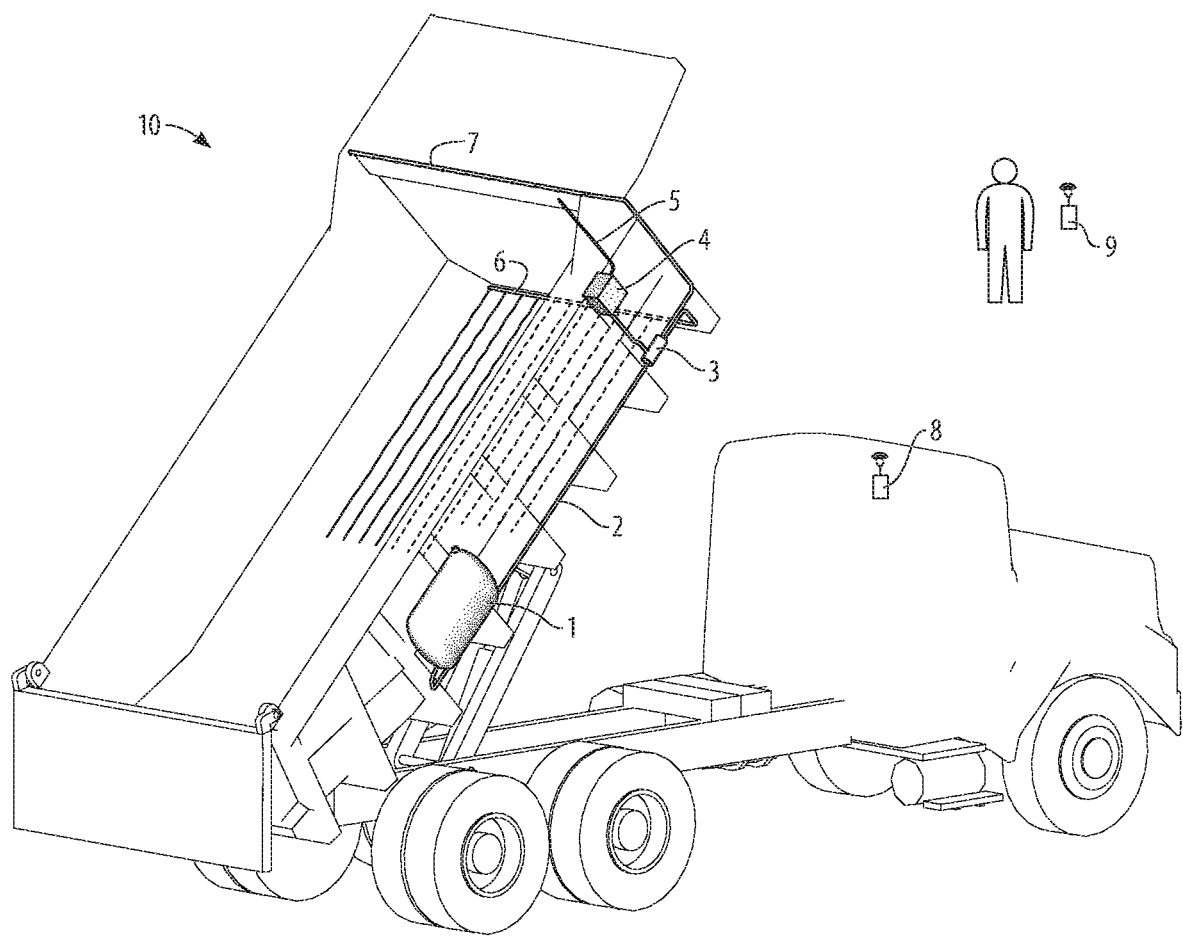
FIG. 9 is a perspective view of an embodiment of the dump-truck fluid assistance system of the invention in use of the lower outflow manifold during unloading.

Referring to FIG. 9, showing the dump-truck fluid assistance system 10 in use on a dump truck having the truck bed up, such as during an unloading operation, streams of fluid are being emitted onto the floor of the truck bed through a lower outflow manifold 6. This phase of operation can be used to provide a flush during unloading to help dislodge material sticking to the floor of the truck bed, and to provide a washing of the truck bed immediately after unloading to eliminate any remaining pieces of material which might become more tightly stuck or which might contaminate a subsequent load of a different material. This phase of operation can also be used to cool the truck bed after unloading.

Figure 10:
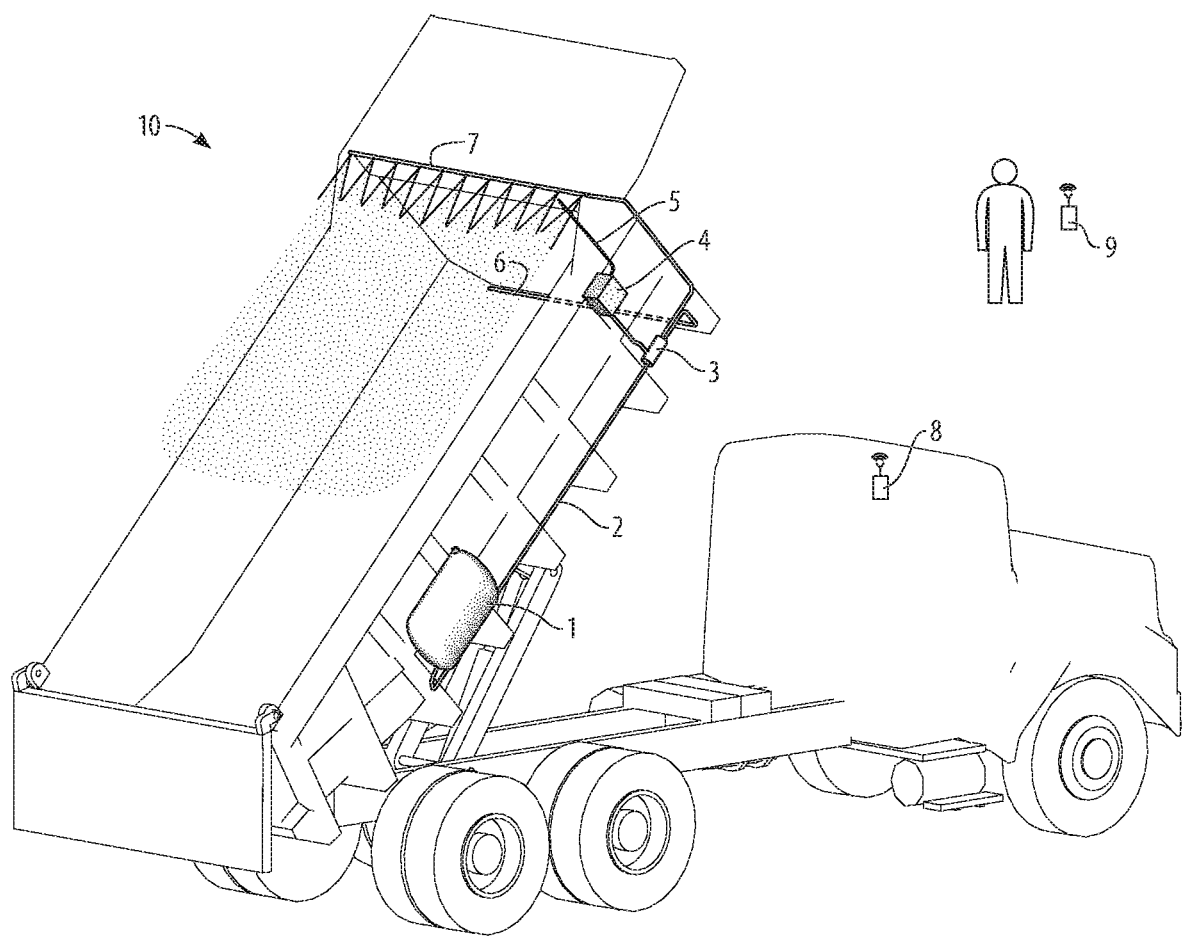
FIG. 10 is a perspective view of an embodiment of the dump-truck fluid assistance system of the invention in use of the higher outflow manifold during unloading.

Referring to FIG. 10, showing the dump-truck fluid assistance system 10 in use on a dump truck having the truck bed up, such as during an unloading operation, sprays of fluid are being emitted into the bed of the dump truck through a higher outflow manifold 7. In addition to providing flushing, washing, and cooling actions as above, this phase of operation can also settle and prevent the formation of dust from the material during the unloading process, improving the safety and environmental impacts of the process.

Many other changes and modifications can be made in the system and method of the present invention without departing from the spirit thereof. I therefore pray that my rights to the present invention be limited only by the scope of the appended claims.

I claim:

1. A dump-truck fluid assistance system for installation on a dump truck, operated by a dump truck operator, the dump truck comprising a truck bed having a pair of truck bed sidewalls, and a front truck bed sidewall, the dump-truck fluid assistance system comprising:
   (i) a fluid reservoir configured for mounting on an exterior of one of the truck bed sidewalls adjacent a pivot point of the truck bed, the fluid reservoir being adapted to hold fluid;
   (ii) a fluid line adapted to convey fluid from said fluid reservoir;
   (iii) a fluid pump adapted to draw fluid from said fluid reservoir through said fluid line and pump out fluid at a controlled flow rate;
   (iv) a controller adapted to control the operation of said fluid pump at the direction of the dump truck operator;
   (v) a controller transceiver adapted to provide communication between said controller and the dump truck operator;
   (vi) at least one outflow manifold mounted inside the truck bed at the front truck bed sidewall, said outflow manifold having a plurality of outlet openings, said outflow manifold receiving a controlled flow of fluid from said fluid pump and delivering the flow of fluid onto the bed of the dump truck through said outlet openings; and
   (vii) at least one operator transceiver adapted to provide communication between the dump truck operator and said controller transceiver;
   where, in use during dump truck loading and unloading operations, at the direction of the dump truck operator communicated from at least one said operator transceiver said controller causes said fluid pump to pump fluid at a controlled flow rate through at least one said outflow manifold and into the truck bed of the dump truck.

2. The dump-truck fluid assistance system of claim 1, where said at least one outflow manifold further comprises a lower outflow manifold and a higher outflow manifold.

3. The dump-truck fluid assistance system of claim 1, where said at least one operator transceiver further comprises a cab operator transceiver and a remote operator transceiver.

4. The dump-truck fluid assistance system of claim 1, where said controller transceiver and said operator transceiver each further comprise being adapted to provide wireless communication.

5. The dump-truck fluid assistance system of claim 1, where said at least one operator transceiver further comprises a remote operator transceiver implemented on a mobile computing device, and said controller transceiver further comprises being adapted to provide wireless communication with the mobile computing device.

6. The dump-truck fluid assistance system of claim 1, where said fluid reservoir further comprises being mounted upon the dump truck at a rearward position corresponding to the pivot point of the truck bed.

7. The dump-truck fluid assistance system of claim 1, where said fluid pump further comprises being mounted upon the truck bed at a forward position near said outflow manifold.

8. The dump-truck fluid assistance system of claim 1, where said at least one outflow manifold further comprises more than one outflow manifold, and where said fluid pump further comprises being adapted to provide separately controllable fluid flows to each said outflow manifold.

9. The dump-truck fluid assistance system of claim 1, where said at least one outflow manifold further comprises a lower outflow manifold further adapted for emission of a stream of fluid onto the floor of the truck bed of the dump truck.

10. The dump-truck fluid assistance system of claim 1, where said at least one outflow manifold further comprises a higher outflow manifold further adapted for emission of a spray of fluid into the truck bed of the dump truck.

11. A dump-truck fluid assistance system method comprising:
  (i) providing a dump-truck fluid assistance system for use on a dump truck comprising a truck bed having a pair of truck bed sidewalls, and a front truck bed sidewall, the dump truck being operated by a dump truck operator, the fluid assistance system comprising:
    (a) a fluid reservoir adapted to hold fluid and configured for mounting on an exterior of one of the truck bed sidewalls adjacent a pivot point of the truck bed;
    (b) a fluid line adapted to convey fluid from said fluid reservoir;
    (c) a fluid pump adapted to draw fluid from said fluid reservoir through said fluid line and pump out fluid at a controlled flow rate;
    (d) a controller adapted to control the operation of said fluid pump at the direction of the dump truck operator;
    (e) a controller transceiver adapted to provide communication between said controller and the dump truck operator;
    (f) at least one outflow manifold mounted inside the truck bed at the front truck bed sidewall, said outflow manifold having a plurality of outlet openings, said outflow manifold receiving a controlled flow of fluid from said fluid pump and delivering the flow of fluid onto the bed of the dump truck through said outlet openings; and
    (g) at least one operator transceiver adapted to provide communication between the dump truck operator and said controller transceiver;
  (ii) installing said dump-truck fluid assistance system on the dump truck;
  (iii) using said dump-truck fluid assistance system during dump truck loading and unloading operations, where, at the direction of the dump truck operator communicated from at least one said operator transceiver said controller causes said fluid pump to pump fluid at a controlled flow rate through at least one said outflow manifold and into the truck bed of the dump truck.

12. The dump-truck fluid assistance system method of claim 11, where said at least one outflow manifold further comprises a lower outflow manifold and a higher outflow manifold.

13. The dump-truck fluid assistance system method of claim 11, where said at least one operator transceiver further comprises a cab operator transceiver and a remote operator transceiver.

14. The dump-truck fluid assistance system method of claim 11, where said controller transceiver and said operator transceiver each further comprise being adapted to provide wireless communication.

15. The dump-truck fluid assistance system method of claim 11, where said at least one operator transceiver further comprises a remote operator transceiver implemented on a mobile computing device, and said controller transceiver further comprises being adapted to provide wireless communication with the mobile computing device.

16. The dump-truck fluid assistance system method of claim 11, where said fluid reservoir further comprises being mounted upon the dump truck at a rearward position corresponding to the pivot point of the truck bed.

17. The dump-truck fluid assistance system method of claim 11, where said fluid pump further comprises being mounted upon the truck bed at a forward position near said outflow manifold.

18. The dump-truck fluid assistance system method of claim 11, where said at least one outflow manifold further comprises more than one outflow manifold, and where said fluid pump further comprises being adapted to provide separately controllable fluid flows to each said outflow manifold.

19. The dump-truck fluid assistance system method of claim 11, where said at least one outflow manifold further comprises a lower outflow manifold further adapted for emission of a stream of fluid onto the floor of the truck bed of the dump truck.

20. The dump-truck fluid assistance system method of claim 11, where said at least one outflow manifold further comprises a higher outflow manifold further adapted for emission of a spray of fluid into the truck bed of the dump truck.

* * * * *